(12) United States Patent
Ni

(10) Patent No.: US 6,297,752 B1
(45) Date of Patent: Oct. 2, 2001

(54) BACKSIDE KEYBOARD FOR A NOTEBOOK OR GAMEBOX

(76) Inventor: Xuan Ni, 5986 Pilgrim Ave., San Jose, CA (US) 95129

( * ) Notice: Subject to any disclaimer, the term of this patent is extended or adjusted under 35 U.S.C. 154(b) by 0 days.

(21) Appl. No.: 08/995,321

(22) Filed: Dec. 22, 1997

Related U.S. Application Data

(63) Continuation-in-part of application No. 08/687,250, filed on Jul. 25, 1996, now abandoned.

(51) Int. Cl.[7] ..................................................... H03K 17/94
(52) U.S. Cl. .............................. 341/22; 341/20; 345/168; 345/172; 400/489; 400/709.1
(58) Field of Search ........................ 341/20, 22; 345/169, 345/172, 168; 400/489, 709.1, 715

(56) References Cited

U.S. PATENT DOCUMENTS

| | | | |
|---|---|---|---|
| 5,278,779 | * 1/1994 | Conway et al. | ......................... 341/20 |
| 5,410,333 | * 4/1995 | Conway | .................................. 341/20 |
| 5,515,305 | 5/1996 | Register et al. | ................. 369/709.15 |
| 5,645,277 | 7/1997 | Cheng | .................................. 273/148 |
| 5,736,976 | * 4/1998 | Cheung | ................................. 345/172 |

* cited by examiner

Primary Examiner—Michael Horabik
Assistant Examiner—Timothy Edwards, Jr.
(74) Attorney, Agent, or Firm—Robert S. Smith

(57) ABSTRACT

A keyboard for a notebook computer, personal computer, Personal Data Assistance computer or a game having two keyboard sections. In one embodiment the sections are fixedly mounted on the underside of the chassis of the device and the keys are arranged with half the keys on one section and half the keys are on the other section and positioned such that each key is in a natural position corresponding to the position of the keys when one is typing on a conventional keyboard. In another embodiment, each section is hingeably attached to an edge of the keyboard and the keyboard may be used in one position where the sections extend from the keyboard and face the user an another position where the sections are folded against the backside of the chassis of the device.

5 Claims, 2 Drawing Sheets

BACKSIDE KEYBOARD FOR A NOTEBOOK OR GAMEBOX

CROSS REFERENCES

This application is a continuation-in-part of Ser. No. 08/687,250 filed Jul. 25, 1996 now abandoned from which priority is claimed.

FIELD OF THE INVENTION

This invention relates to keys of computer keyboards and the like and particularly to the keys of a keyboard mounted on the backside of the notebook computer or game box.

BACKGROUND AND INFORMATION DISCLOSURE

Along with the tremendous growth in the development and marketing of personal computers and computer games, there has been a widespread occurrence of various forms of a malady classified as "repetitive motion syndrome". (RMS). This malady is especially prevalent among users of keyboards wherein long periods of typing lead to such conditions as "carpal tunnel syndrome" and strain in the ligaments and tendons of the wrists. The problem is exacerbated by the unnatural position of the hands while typing in which the wrists are turned so that the palms of the hand face downward while the fingers move across the board activating the keys. The wrists are twisted when the hand is in this orientation.

The patent literature contains a number of references intended to address this problem. For example, U.S. Pat. No. 5,502,460 discloses a keyboard having two sections of keys tilted with respect to one another.

U.S. Pat. No. 5,515,305 to Register discloses a PDA having a chord keyboard on the backside of the chassis for forming single alphanumeric indicia by depressing combinations of keys.

U.S. Pat. No. 5,645,277 to Cheng discloses hand held control units with finger operating surfaces.

U.S. Pat. No. 549,037 discloses a tiltable keyboard.

U.S. Pat. No. 5,645,277 to Cheng discloses hand held units with finger operating surfaces.

U.S. Pat. No. 5,515,305 to Register et al discloses a computer having a chord keyboard mounted on front and rear surfaces of the PDA computer. The problem with this keyboard is that each alphanumeric datum is entered by pressing a combination of keys and therefore the depression of the keys is not consistent with the layout of the typical keyboard to which the user has become accustomed.

However, there is no thought given to a conventional keyboard with 40 keys positioned on a keyboard in an arrangement that reduces stress on the wrists as effectively as the present invention while permitting the user to manipulate his fingers according to his training to operate state of the art keyboards.

SUMMARY

It is an object of this invention provide a keyboard for a notebook, personal data assistant (PDA), or game box. The keyboard is positioned on a surface on the side of the chassis facing away from the user so that the fingers and hands are in a "natural" position. In the contest of this specification, "natural" position is defined as meaning that the palms are turned upward facing the underside of the box when typing thereby minimizing strain on the wrists, the palms are turned upward facing the underside of the box when typing thereby minimizing strain on the wrists. The keys are arranged in a "standard" position meaning that they are arranged on the keyboard in the same arrangement as the standard keyboard so that the user has the same "feel" of location that occurs when the keyboard is on the top surface of the chassis thereby eliminating the strain caused by twisting the wrist to type in the state of the art position.

DESCRIPTION OF AN ILLUSTRATIVE EXAMPLE

Figure 1:
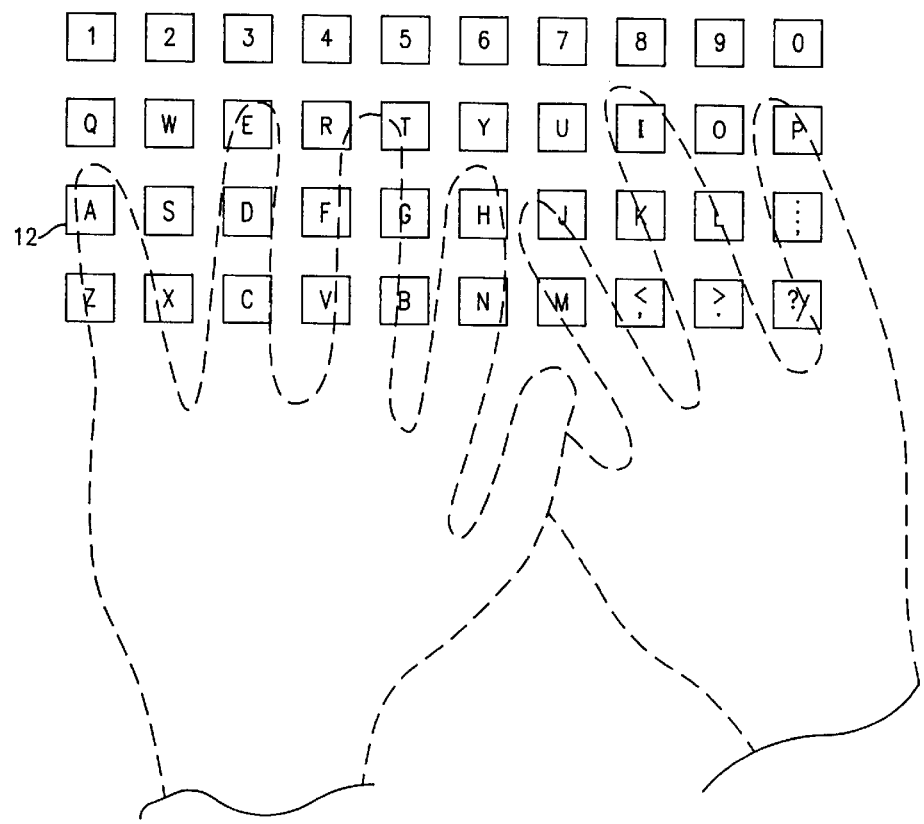
FIG. 1 shows the arrangement of the keys on the front side of a keyboard according to the prior art.

Turning now to a discussion of the drawings, FIG. 1 is a drawing showing the arrangement of the keys on a keyboard to the prior art. The hands are shown in phantom in a natural position according to conventional typing procedure with the fingers extending out over the keys in a position for typing. The little finger 12 of the left hand is proximal to the letter A and the fore finger 14 of the left hand is proximal to the letter F according to customary practice.

Figure 2:
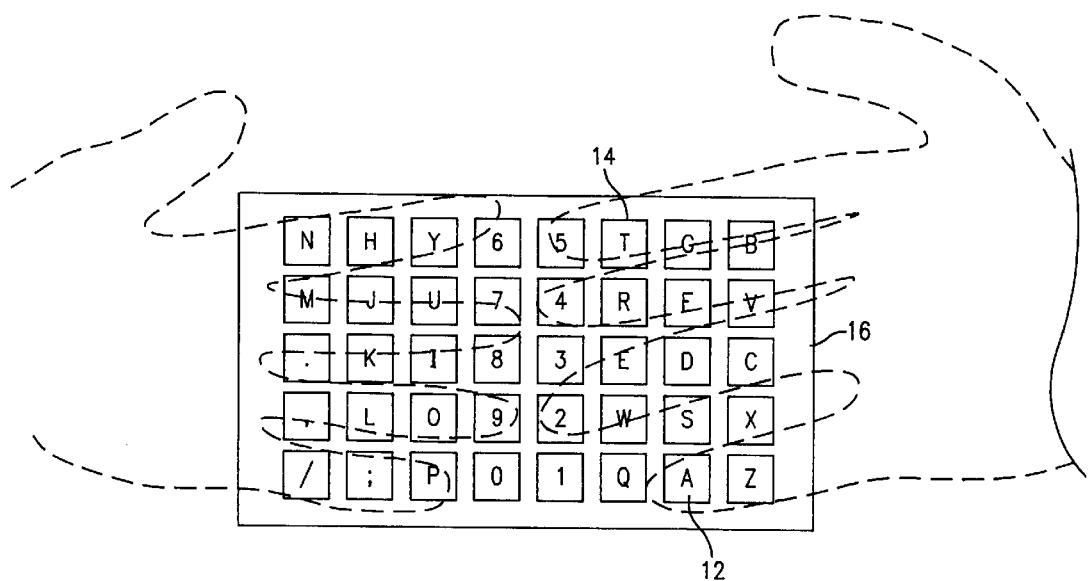
FIG. 2 shows the arrangement of the keys on the backside of a keyboard.

FIG. 2 shows the keyboard 16 mounted on the backside of the chassis according to the invention with the fingers extending over the keys in a position for typing. The fingers and keys are shown in phantom with the little finger 12 of the left hand proximal to the letter A and the forefinger of the left hand proximal to the letter F as in FIG. 1.

Figure 3:
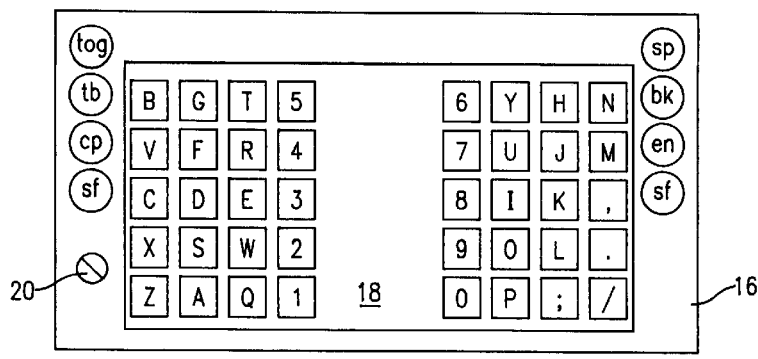
FIG. 3 shows an image on the screen of the keys on the reverse side of the chassis.

FIG. 3 shows the front side of the chassis 16 with a display screen 18 showing the arrangement of the keys as would appear to the user if the chassis 16 were transparent. A switch 20 is provided which may be a momentary switch or a two position switch which is operable with the thumb and which, in one position shows data and in a second position shows the key layout on the screen to enable the user to position his hands when he is beginning his typing.

Figure 4:
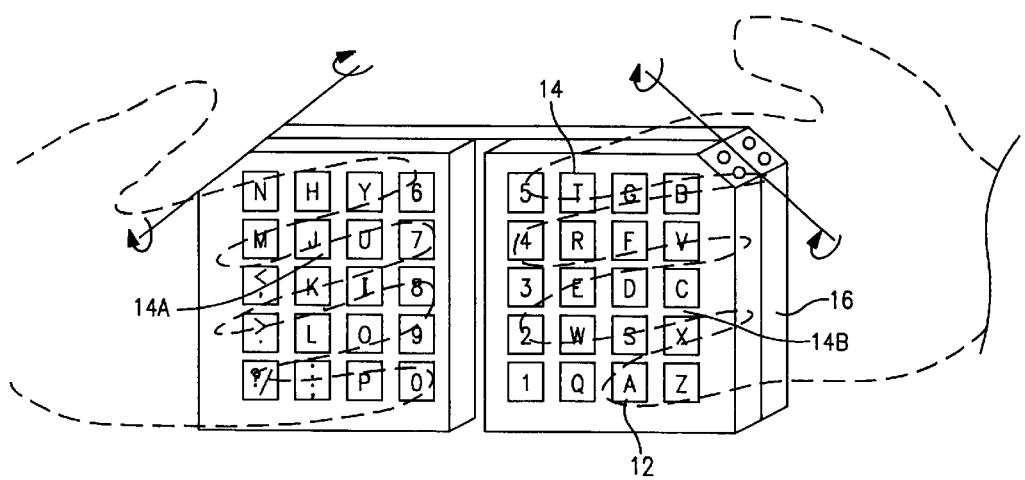
FIG. 4 shows the "angel wing" configuration with keyboard sections folded.
Figure 5:
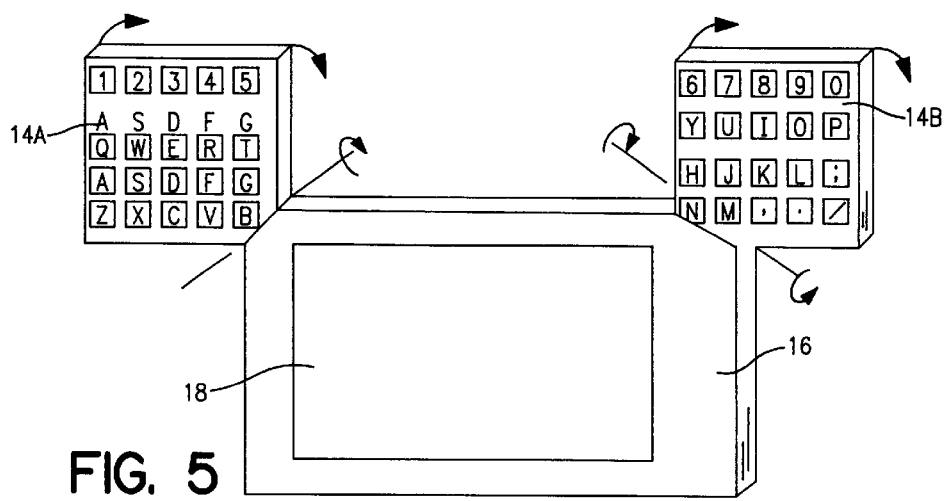
FIG. 5 shows the "angel wing" configuration with keyboard sections unfolded.

FIGS. 4 and 5 show an embodiment in which the keyboard comprises two separate sections 14A and 14B. FIG. 4 shows the rear surface of the notebook 16 "closed" with each keyboard section oriented against the underside of the computer. FIG. 5 shows the notebook "open with each section oriented away from the computer. One section is hinged by hinge to the upper right hand corner of a notebook computer and another section hinged by hinge to the to the upper left hand corner. The axes of rotation are shown oriented 45° with respect to the side edges of the notebook computer.

When the computer is "open" (FIG. 5) the hands are in the position illustrated in FIG. 1 which is the method according to the prior art. When the computer is "closed" (FIG. 4) the hands are in position illustrated in FIG. 2 with the hand <u>under</u> under the keyboard and fingers extending over the keys, in the same relative position as the prior art and FIG. 5.

It may be noted that the wrists illustrated in FIG. 2 are not subjected to the twisting strain illustrated in the "standard" orientation shown in FIG. 1.

Other variations of the invention may be suggested by reading the specification and studying the drawings which are within the scope of the invention. For example, the keyboard of this invention may be either a personal computer, a Newton computer, a personal digital assistant or a game.

I therefore wish to define the scope of my invention by the appended claims.

I claim:

1. A keyboard for an electronic device, said device being one of
   (i) a notebook computer;
   (ii) a personal digital assistant computer;
   (iii) a game;
   mounted in a chassis having a substantially rectangular shape and front surface opposite a rear surface; wherein said keyboard comprises:
      said front surface facing an operator when said operator is operating said device;
      a right keyboard section having a right array of keys arranged on a key side of said right keyboard section;
      a left keyboard section having a left array of keys arranged on a key side of said left keyboard section;
      said right and left arrays arranged to provide that when said right keyboard section is positioned with a parting edge of said right keyboard section against a parting edge of said left keyboard section, the combination of said left and right arrays is arranged identically to a standard keyboard;
      means for securing said backside of said right keyboard section and said backside of said left keyboard section to said rear surface of said chassis oriented in a first position to provide that when said user faces said front surface and holds said device with a left hand holding a left edge and a right hand holding a right edge of said device, fingers of said left and right hand are in a normal position in which the palms of the hand are turned toward the face of the user and they have the same spatial relationship to said left and right arrays respectively as when the fingers are positioned for typing on a standard keyboard.

2. The device of claim 1 wherein said device comprises a monitor screen mounted on said front surface.

3. The device of claim 1 wherein said means for securing comprises:
   a left hinge located an upper left corner of said chassis and coupling said left keyboard section to said chassis; and
   a right hinge located in an upper right corner of said chassis and coupling said left keyboard section to said chassis;
   said right and left hinges arranged in operable combination with said chassis and said right and left keyboard sections, respectively, to permit orientation of said right and left keyboard sections to said first position and orientation of said right and left keyboard sections to a second position where said right and left keyboard sections face said operator with left and right arrays oriented to permit typing with fingers of said left and right hand having the same spatial relationship to said left and right arrays respectively as when the fingers are positioned for typing on a standard keyboard.

4. The device of claim 1 which comprises at least one additional key on said front surface.

5. The device of claim 4 wherein said one additional key is a two position switch wherein, in one position, said screen presents an image of said keyboard aligned with said keyboard whereby a user is presented with a visual guide to keys on said keyboard and, in another position, presents data.

* * * * *